(12) United States Patent
Park et al.

(10) Patent No.: US 8,297,828 B2
(45) Date of Patent: Oct. 30, 2012

(54) LIGHT GUIDE PANEL

(75) Inventors: Jong Jin Park, Daejeon (KR); In Geol An, Kyungki-do (KR)

(73) Assignee: Samsung LED Co., Ltd., Gyunggi-do (KR)

( * ) Notice: Subject to any disclaimer, the term of this patent is extended or adjusted under 35 U.S.C. 154(b) by 0 days.

(21) Appl. No.: 11/594,092

(22) Filed: Nov. 8, 2006

(65) Prior Publication Data
US 2007/0109810 A1    May 17, 2007

(30) Foreign Application Priority Data

Nov. 17, 2005    (KR) .................. 10-2005-0110403

(51) Int. Cl.
*F21V 7/04* (2006.01)
(52) U.S. Cl. ........ 362/615; 362/612; 362/621; 362/97.3
(58) Field of Classification Search .......... 362/601, 362/611, 612, 615, 621, 628, 607, 610, 616, 362/617, 97.1, 97.4, 223, 235, 244, 249.02, 362/308; 385/129–131, 901
See application file for complete search history.

(56) References Cited

U.S. PATENT DOCUMENTS

| | | | | |
|---|---|---|---|---|
| 2,625,646 | A * | 1/1953 | Goebel | 362/224 |
| 5,136,483 | A * | 8/1992 | Schoniger et al. | 362/545 |
| 5,375,043 | A * | 12/1994 | Tokunaga | 362/601 |
| 5,695,269 | A * | 12/1997 | Lippmann et al. | 362/27 |
| 5,746,493 | A * | 5/1998 | Jonsson et al. | 362/602 |
| 6,139,163 | A * | 10/2000 | Satoh et al. | 362/612 |
| 6,183,099 | B1 * | 2/2001 | Garay et al. | 362/26 |
| 6,193,383 | B1 * | 2/2001 | Onikiri et al. | 362/26 |
| 6,288,700 | B1 * | 9/2001 | Mori | 345/102 |
| 6,987,710 | B2 * | 1/2006 | Kibiloski et al. | 368/67 |
| 7,172,327 | B2 * | 2/2007 | Kuo | 362/609 |
| 2002/0054489 | A1 * | 5/2002 | Hirayama | 362/31 |
| 2006/0092664 | A1 * | 5/2006 | Kim et al. | 362/611 |
| 2006/0104090 | A1 * | 5/2006 | Lengyel et al. | 362/612 |

FOREIGN PATENT DOCUMENTS

CN    2596387 Y    12/2003
(Continued)

OTHER PUBLICATIONS

Chinese Office Action, with English Translation, issued in corresponding Chinese Patent Application No. 200610138185.8, mailed on Oct. 19, 2007.

(Continued)

*Primary Examiner* — Danielle Allen
(74) *Attorney, Agent, or Firm* — McDermott Will & Emery LLP

(57) ABSTRACT

The invention relates to a light guide panel capable of distributing light beams incident from a light source to an entire surface thereof. The light guide panel has at least two through holes formed in a path of the incident light beams, apart in a predetermined interval from a light incident surface. The through holes are formed perpendicular to the path of the incident light beams, and lined along the light incident surface of the light guide panel. The light guide panel according to the present invention can improve uniformity of incident light without increasing the number or size of the light source, thereby distributing the incident light in a wider angle and decreasing a light mixing region. The light guide panel is produced in a simple manufacturing process, reducing the manufacturing costs.

4 Claims, 5 Drawing Sheets

FOREIGN PATENT DOCUMENTS

| | | |
|---|---|---|
| JP | 2000-149635 A | 5/2000 |
| JP | 2001-35229 A | 2/2001 |
| JP | 2002-175713 | 6/2002 |
| JP | 2003-100132 | 4/2003 |
| JP | 2004-247145 | 9/2004 |
| JP | 2007-505447 | 3/2007 |
| KR | 10-0484536 B1 | 4/2005 |
| WO | WO 2005/024477 A1 | 3/2005 |

OTHER PUBLICATIONS

Japanese Office Action issued in Japanese Patent Application No. JP 2006-307410 dated May 19, 2009.

Japanese Office Action, with English translation, issued in Japanese Patent Application No. 2006-307410, mailed Jun. 15, 2010.

* cited by examiner

LIGHT GUIDE PANEL

CLAIM OF PRIORITY

This application claims the benefit of Korean Patent Application No. 2005-110403 filed on Nov. 17, 2005, in the Korean Intellectual Property Office, the disclosure of which is incorporated herein by reference.

BACKGROUND OF THE INVENTION

1. Field of the Invention

The present invention relates to a light guide panel, and more particularly, to a light guide panel capable of uniformly distributing incident light beams from a light source to an entire surface thereof.

2. Description of the Related Art

To date, there have been various types of thin display devices, among which the mainstream has been the Liquid Crystal Displays (LCDs).

The LCDs are applied to various apparatuses including thin wall-mount televisions, notebook computers, monitors for desk-top computers, navigation devices, Personal Digital Assistants (PDAs), mobile phones and game systems. The liquid crystals constituting a display device of the LCD cannot emit light independently and simply transmits or blocks light in response to an electric signal received.

Therefore, in order to display information on the LCD, there is required a separate surface light emitting device, so called a backlight, for lighting the LCD from the back. Such a backlight needs to uniformly irradiate the LCD with high luminance and form a uniform surface light source, which is an important aspect of the quality of the product.

A conventional backlight includes a light source, a light guide panel, a diffusion sheet, a prism and a protective sheet. For its light source, typically a fluorescent lamp such as a Cold Cathode Florescent Lamp (CCFL) or an LED (the LEDs, are widely used for small-size display devices due to their light weight and small size) is used. The light guide panel serves to induce the light beams, from the light source, uniformly upward. The diffusion sheet scatters light to achieve uniform luminance. The prism refracts light vertically and horizontally to collect the light, thereby improving luminance. The protective sheet blocks foreign material from getting in the grooves of the prism and prevents scratch on the surface thereof.

In addition, the light guide panel has a reflecting sheet installed on an underside surface thereof for reflecting the light directed to the bottom of the light guide panel, thereby improving light efficiency. These members are fixed to an LCD substrate in a frame.

Here, the light source emits light toward a side of the light guide panel, and the light guide panel receives the light from the light source through a side thereof to emit light to the front.

Now, the conventional light guide panel will be explained hereunder with reference to the accompanying drawings.

FIG. 1 is a front view illustrating the conventional light guide panel with LEDs disposed next to the light guide panel, and FIG. 2 is an enlarged view illustrating the paths of light from the LED into the light guide panel.

The light guide panel 10, illustrated in FIGS. 1 and 2, has a plurality of LEDs, one of the point light sources, mounted adjacent to a lower edge thereof. The light beams incident from the LED 20 and directed to the side end of the light guide panel 10 are refracted in a predetermined angle due to the refraction difference between the air and the light guide panel 10 and thereby incident into the light guide panel 10. As a result, the incident light beams from the LED 20 form such a distribution in which the light beams incident perpendicular (along a normal line) to the light incident part of the light guide panel have the greatest concentration, and the concentration decreases with the incident angle increasing toward 90 degrees in the left and right with respect to the normal line. That is, the light guide panel 10 is brighter at a portion on the same plane perpendicular to the LED 20 than other portions biased in predetermined angles to the left or right side from the LED 20.

FIG. 3 is a front view of the conventional light guide panel with light beams incident from a plurality of LEDs.

The LED 20 is much smaller than the width of the light guide panel 10, and thus in order to light the entire portion of the light guide panel 10, a plurality of LEDs 20 are disposed at a side of the light guide panel 10, spaced apart in a predetermined interval.

When power is applied to each of the LEDs 20 and light beams are incident into the light guide panel 10, the portions closest to each of the LEDs 20, i.e., the portions directly perpendicular to the LEDs 20 form bright spots 12 whereas the portions farthest to each of the LEDs 20, i.e., the portions diagonally away from the LEDs in the left or right side form dark spots 14.

The alternating bright spots 12 and dark spots 14 hinder uniformity, which is one of the important qualities of the backlight. The LCD manufactured with such a light guide panel 10 has a mixing region, that is not bright uniformly, which refers to a region formed from the light incident surface to a portion where the light beams are evenly mixed, and thus is inadequate for use. The larger mixing region results in a smaller usable portion of the screen.

Needless to say, the LED 20 having the same width as that of the lower end of the light guide panel 10 would solve such a problem of non-uniformity. However, it is difficult to manufacture an LED having such a width corresponding to that of the lower end of the light guide panel 10. Alternatively, a greater number of LEDs 20 can be positioned densely along the light incident surface, which however increases the manufacturing costs.

In an effort to overcome such a problem, a light guide panel, having recesses in the form of concave lenses at a light incident part thereof to diffuse the incident light beams, has been suggested in Korea Patent No. 10-0484536.

However, it is difficult to form a plurality of recesses each having the same dimension at a side of the light guide panel. This configuration widens the incident angle of the incident light beams but renders it difficult to refract the incident light beams toward a width direction of the light guide panel. Therefore, the conventional technology is also limited in enhancing the uniformity of light beams incident into the light guide panel.

SUMMARY OF THE INVENTION

The present invention has been made to solve the foregoing problems of the prior art and therefore an object of certain embodiments of the present invention is to provide a light guide panel which can improve uniformity of incident light beams without increasing the size or the number of LEDs, distribute the incident light beams in wider angles, and requires a simple manufacturing process to reduce manufacturing costs.

According to an aspect of the invention for realizing the object, there is provided a light guide panel including at least one through hole formed in a path of the incident light beams, apart in a predetermined interval from a surface of light incidence in the side of the light guide panel.

The through hole is extended perpendicular to the path of the incident light beams.

The light beams are incident into the light guide panel from at least two light sources, and the light guide panel includes at least two of the through hole arranged to form through-hole groups each adjacent to each of the light sources.

The through holes of the through-hole groups are lined along the surface of light incidence of the light guide panel.

Here, each of the through holes is disposed apart from another adjacent through hole in an interval of 0.1 to 1.0 mm, and each of the through-hole groups including the through holes is lined in a length of 0.3 to 10.0 mm.

In addition, the through hole has a circular or an oval cross-section, and it is preferable that the through hole has a diameter of 0.1 to 1.5 mm.

In addition, it is preferable that the through hole is formed apart from the surface of light incidence of the light guide panel in an interval of 0.1 to 3.0 mm.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The following description will present embodiments of a light guide panel for uniformly distributing incident light beams according to the present invention with reference to the accompanying drawings.

Figure 1:
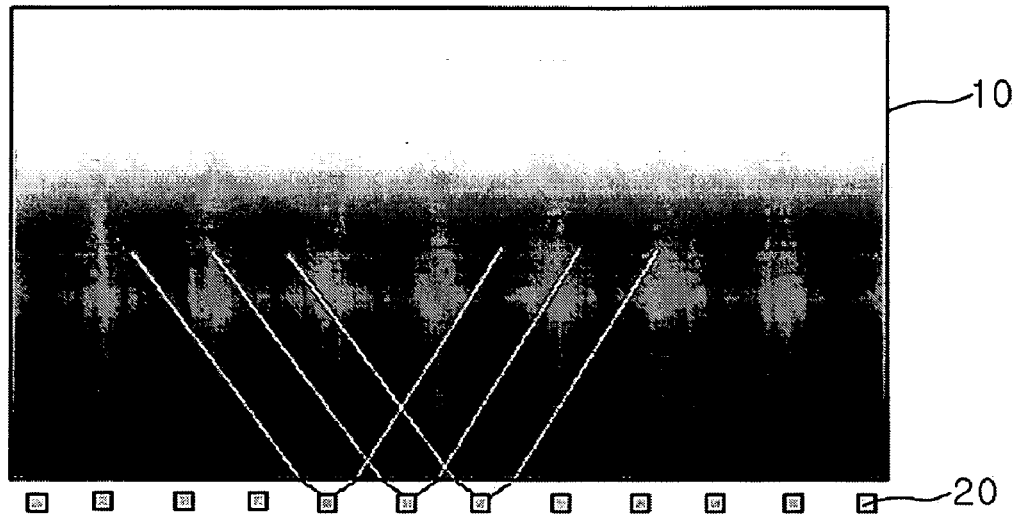
FIG. 1 is a front view illustrating a conventional light guide panel with LEDs disposed next to the light guide panel.
Figure 3:
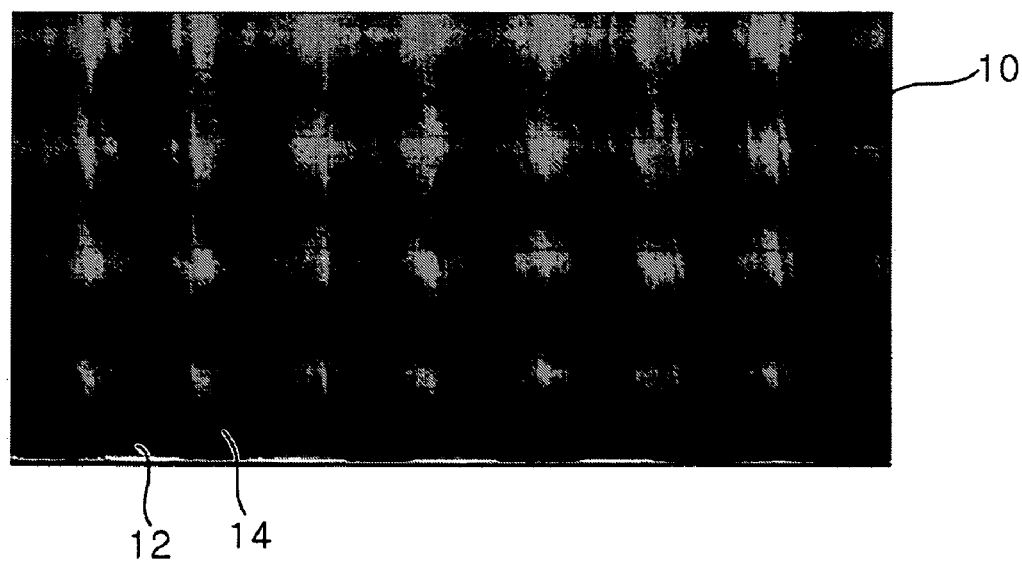
FIG. 3 is a front view illustrating the conventional light guide panel with incident light beams from a plurality of LEDs.
Figure 2:
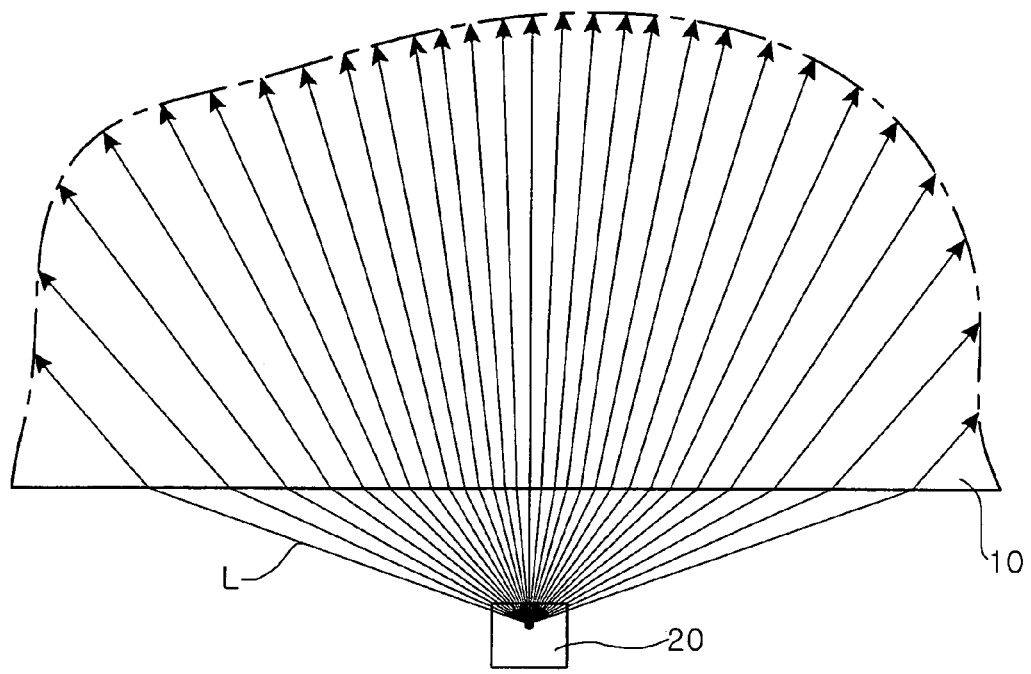
FIG. 2 is an enlarged view illustrating the light paths of the light beams incident into the conventional light guide panel.
Figure 4:
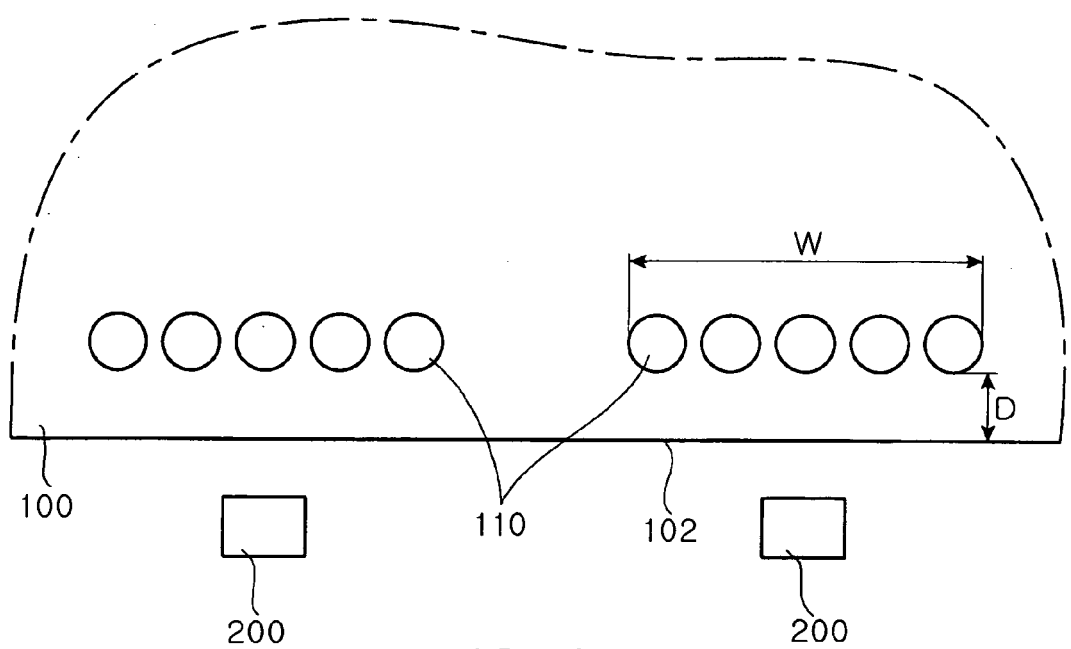
FIG. 4 is an enlarged front view illustrating the light incident surface of a light guide panel according to the present invention.

FIG. 4 is an enlarged front view illustrating a light incident surface of a light guide panel according to the present invention.

As shown in FIG. 4, the light guide panel 100 according to the present invention receives light beams from a plurality of LEDs 200 disposed at a side and has through holes (or at least one through hole) 110 formed in a path of the incident light beams, apart in a predetermined interval from a surface where the light beams are incident, i.e., a light incident surface 102.

In this embodiment, the LEDs 200 are disposed apart from a lower end of the light guide panel 100 in a predetermined interval, but the LEDs 200 are not limited in their location with respect to the light guide panel 100. Alternatively, the LEDs 200 can be disposed at opposed sides or an upper end of the light guide panel 100 depending on the usage thereof or selection by the user.

In addition, in this embodiment, the LEDs 200 are used as a light source for emitting light into the light guide panel 100, but the light source may include any structure capable of emitting light, such as a Cold Cathode Florescent Lamp (CCFL).

The through holes 110 are lined along a thickness direction of the light guide panel, perpendicular to the paths of light beams. At least two through holes disposed adjacent to each of the LEDs 200 form a through-hole group. The plurality of through holes 110 of the through-hole groups may be lined in a row along the light incident surface of the light guide panel 100 as shown in FIG. 4 or in a curve such as an arc shape or in two or more rows.

Figure 5:
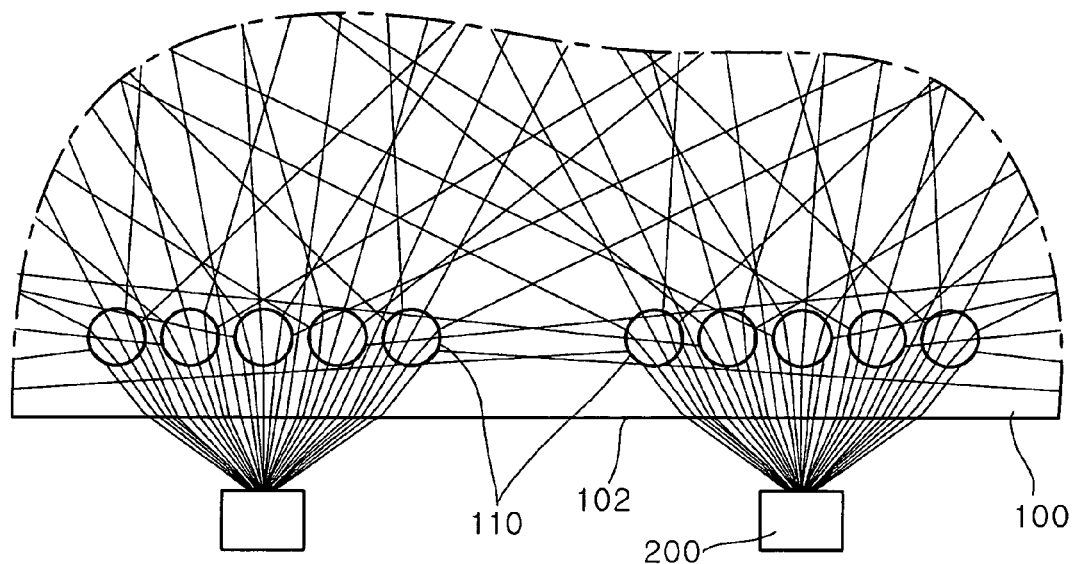
FIG. 5 is a partial front view illustrating the paths of light beams incident into the light guide panel according to the present invention.

FIG. 5 is a partial front view illustrating the paths of light beams incident into the light guide panel 100 according to the present invention.

When power is applied to the LEDs 200, as shown in FIG. 5, LEDs 200 emit light beams in predetermined angles toward the light incident surface 102 of the light guide panel 100. At this time, as the light guide panel 100 has a higher refractive index than the air, each of the light beams L incident through the light incident surface 102 of the light guide panel 100 is refracted in a direction that forms a smaller incident angle, i.e., closer to a line perpendicular to the light incident surface, according to the Snell's Law. The structure of the LED 200 that emits light into the light guide panel 100 according to the present invention is identical to that of the conventional LED 20. Also, the refraction of light beams through the light incident surface 102 occurs in the same way as in the conventional light guide panel 100. Thus, no further explanation is provided on these subjects.

The light beams L incident into the light guide panel 100 through the light incident surface 102 are refracted to be spread widely as they pass through the through holes 110 and propagate to various portions of the light guide panel 100. The light beams incident into each of the through holes 110 have different distributions of brightness, but are spread widely as they pass through the through holes 110 to reach the center portion of the light guide panel 100. Thus, after passing through the through holes 110, light beams of high distribution and low distributions are evenly mixed, thereby resulting in uniform brightness in the various portions of the light guide panel 100.

The light beams refracted by the through holes 110 are widely spread to the degree that the light beams propagate in opposed horizontal directions, and thus there are no dark spots 14 formed between each of the LEDs 200. Particularly, in a case where the colors of light emitted from each of the LEDs 200 are different, the light guide panel 100 of the present invention is especially effective for evenly mixing the light beams.

In addition, when the display device is manufactured using the light guide panel 100 of the present invention, the mixing region is smaller than the conventional display device using the conventional light guide panel 10, thereby allowing a larger display screen.

The condition in which light beams from the LEDs 200 are spread widely as they pass through the through holes 110, will be explained hereunder in detail with reference to FIG. 6.

Figure 6:
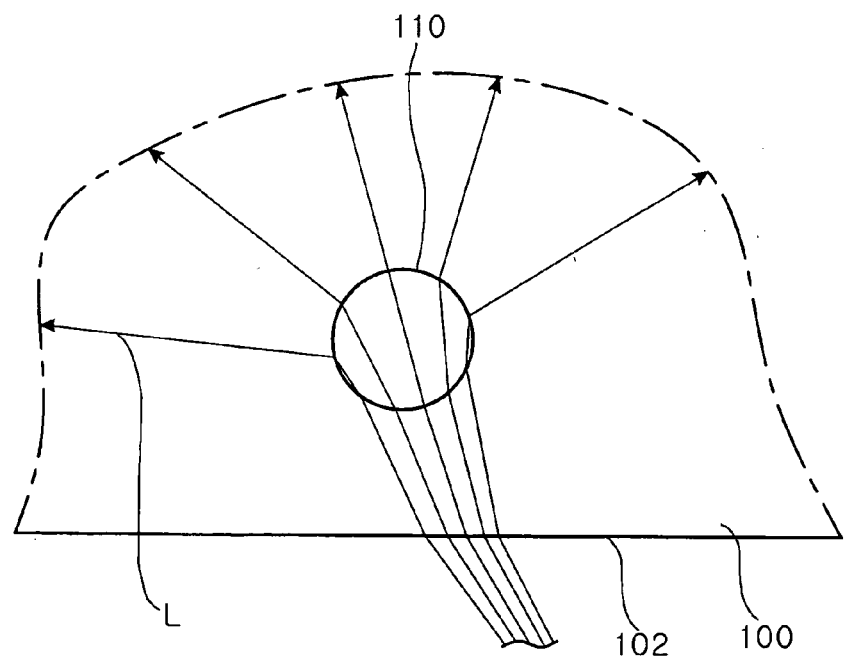
FIG. 6 is an enlarged view illustrating the paths of light beams passing through a through hole of the light guide panel according to the present invention.

FIG. 6 is an enlarged view illustrating the paths of the light beams passing through the through hole 110 when incident into the light guide panel 100.

The light beams directed to the through hole 110 are refracted once when incident into the through hole 110 and refracted again when escaping the through hole 110.

At this time, the refraction angles of the light beams as they pass through the through hole 110 vary according to the different incident points of the through hole 110 the light beams come in contact with. As shown in FIG. 6, when the light beam passes specific incident points on a peripheral surface of the through hole 110, in the central portion of the through hole 110, it forms right angles with respect to tangent lines at the incident points when entering the through hole 110 and when escaping the through hole 110, and thus is not refracted but propagates straight forward. The light beam passing through a peripheral left or right portion of the through hole 110 intersects the peripheral surface obliquely when entering the through hole 110 and escaping the through hole 110, and thus is refracted twice.

For example, the light beam directed to the left portion of the through hole 110 enters the through hole 110 to a medium of a low refractive index, and thus is refracted in a counter-clockwise direction at a larger angle into the medium of a low refractive index, i.e., the through hole 110.

Then, the light beam escaping the through hole 110 enters a medium of a high refractive index, and thus is refracted at a smaller angle into the medium of a high refractive index, i.e., the light guide panel 100. Here, considering the tangent line to the peripheral surface, counter-clockwise refraction makes the light beam to be incident in a smaller angle. Therefore, the light beam incident through the left portion of the through hole is refracted once in a counter-clockwise when entering the through hole 110 and refracted again in a counter-clockwise when escaping the through hole 110.

On the other hand, the light beam incident through a right portion of the through hole 110 is refracted once in a clockwise direction when entering the through hole 110 and refracted again in a clockwise direction when escaping the through hole 110, by the same principle described above. The same principle by which the light beam incident through a right portion of the through hole 110 is refracted twice applies to the case of the light beam incident through a left portion of the through hole 110, and thus a detailed explanation is omitted.

As described above, the light beams passing through the through hole 110 are spread more widely when escaping the through hole 110 than when entering the through hole 110. As a result, the illumination is uniform in the entire portion of the light guide panel 100.

In the case of the conventional light guide panel with recesses formed on the light incident surface, light beams incident into the light guide panel are refracted once only at the recesses. However, in the light guide panel 100 according to the present invention, light beams are refracted first when entering the through hole 110 and refracted secondly when escaping the through hole 110, thereby significantly enhancing the light spreading effect.

Here, if the interval between each of the through holes 110 is too narrow, the shape of the through hole 110 may be deformed, hindering the refraction of the light beams in predetermined angles. If the interval between the through holes 110 is too wide, too large an amount of light passes between the adjacent through holes 110. Therefore, it is preferable that the through hole 110 has an interval ranging from 0.1 to 1.0 mm with another adjacent through hole 110.

In addition, too long a length W (see FIG. 4) of a through-hole group with the through holes 110 lined therein results in a difficult manufacturing process and a risk of damaging the portion of the light guide panel where the through holes 110 are formed. Conversely, too short a length W of a through-hole group with the through holes 110 lined therein deteriorates the refraction effect of light. Thus, it is preferable that the through holes 110 are lined in a through-hole group in a length of 0.3 to 10.0 mm.

The through hole 110 formed in the light guide panel according to the present invention may be configured to have an oval or polygonal cross-section in the case where the user desires a specific lighting effect by refracting the light beams in a specific angle. In order to uniformly distribute the incident light beams, it is preferable that the through holes 110 are configured to have a circular cross-section, i.e., a cylindrical shape as in this embodiment. Here, too large a diameter of the through hole 110 causes a decrease in the number of through holes 110, thus resulting in narrow angles of spreading light. Too small a diameter of the through hole 110 causes difficult manufacturing process. Therefore, it is preferable that the through hole 110 has a diameter of 0.1 to 1.5 mm.

In addition, a longer distance D between the through hole 110 and the light incident surface 102 (see FIG. 4) may result in a narrower usable area. Conversely, too short a distance D between the through hole 110 and the light incident surface 102 may result in connecting the through hole 110 to the light incident surface or in ruining the flatness of the light incident surface 102. Therefore, it is preferable that the through hole 110 is formed apart in an interval of 0.1 to 3.0 mm from the light incident surface 102.

Figure 7:
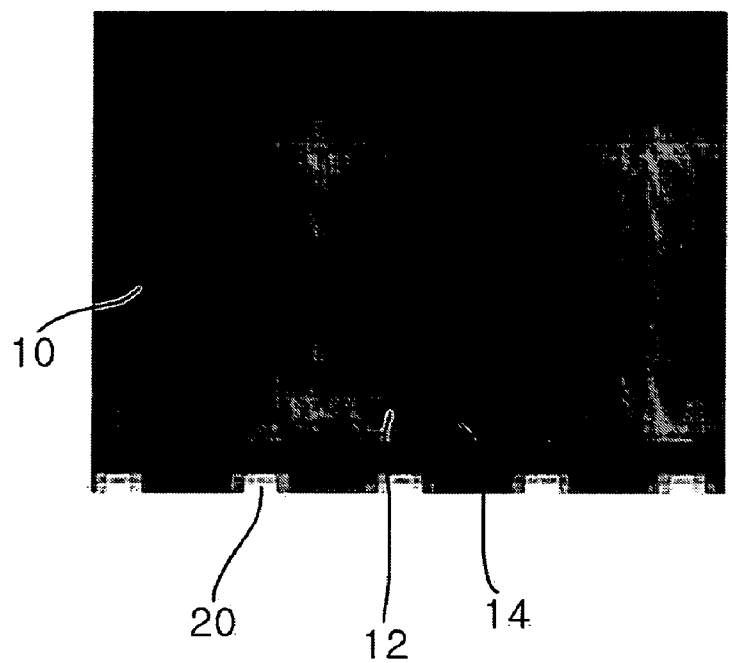
FIG. 7 is a picture illustrating a simulation result of the conventional light guide panel.
Figure 8:
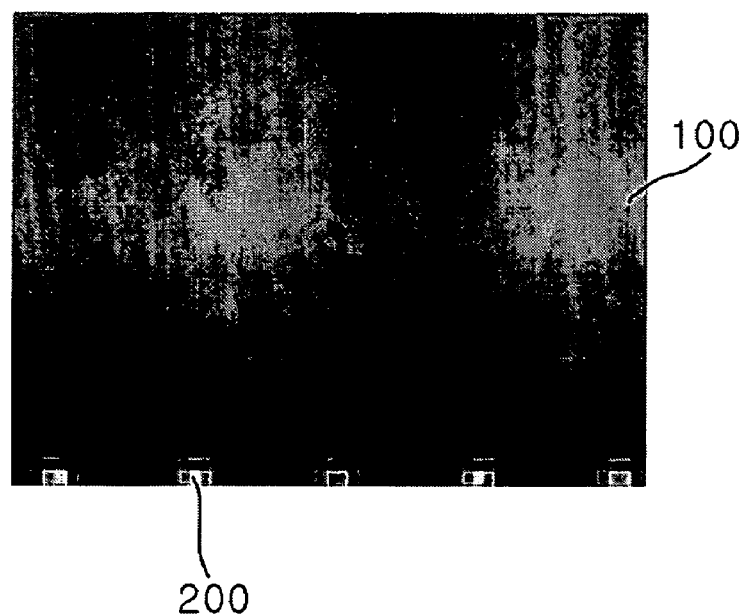
FIG. 8 is a picture illustrating a simulation result of the light guide panel according to the present invention.
Figure 9:
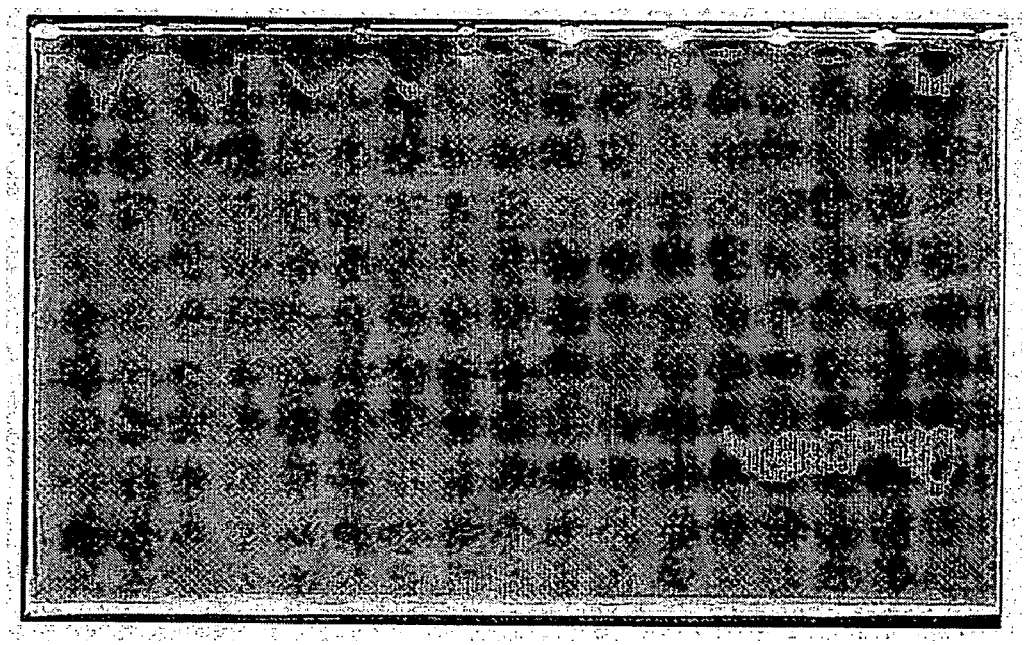
FIG. 9 is a picture illustrating incident light beams in a light guide panel with through holes formed only in a portion thereof.

FIG. 7 is a picture illustrating a simulation result of the conventional light guide panel with light beams incident thereinto, and FIG. 8 is a picture illustrating a simulation result of the light guide panel according to the present invention with light beams incident thereinto, and FIG. 9 is a picture of light beams incident into a light guide panel having through holes formed only in a portion thereof.

As shown in FIG. 7, in the display device manufactured using the conventional light guide panel 10, as light is incident, bright spots 12 and dark spots 14 alternate in the display screen. On the contrary, in the display device manufactured using the light guide panel 100 according to the present invention, as light is incident, the display screen exhibits uniform brightness regardless of the number or position of the LEDs 200, indicating improved product quality.

The simulation is exemplified by using light guide panel 100 of the present invention used for a display device, but the light guide panel 100 of the present invention is not limited to the use for the display device, and may be applied to various lighting devices, light emitting devices and display devices.

The difference in performance is clearer by operating the device after forming the through holes only in a portion in a light guide panel as shown in FIG. 9. The light guide panel shown in FIG. 9, has the through holes formed only in a right half portion thereof. Thus, the bright spots and dark spots are clearly visible in the left half of the light guide panel, whereas the bright spots and dark spots are relatively vague in a right half portion of the light guide panel with the through holes formed therein, exhibiting a smaller mixing region where the light beams are mixed.

The light guide panel according to the present invention is capable of enhancing the uniformity of light incident thereinto without increasing the number or the size of the light source, distributing the incident light in a wider angle to decrease the mixing region, and is produced in a simple manufacturing process to reduce the manufacturing costs.

In addition, the light guide panel according to the present invention results in a wider display screen and adjusts the refraction angle of light by modifying the shape of the through hole, thereby more simply enabling various lighting effects.

While the present invention has been shown and described in connection with the preferred embodiments, it will be apparent to those skilled in the art that modifications and variations can be made without departing from the spirit and scope of the invention as defined by the appended claims.

What is claimed is:

1. A light guide panel with light beams incident through a side thereof, comprising:
   a plurality of through holes formed in a path of the incident light beams perforating the light guide panel from a top surface to a bottom surface thereof, spaced apart from a light incident surface in the side of the light guide panel by a predetermined interval,
   wherein the light beams are incident to the light guide panel through the light incident surface from a number of light sources, facing the light incident surface and the plurality of through holes spaced apart from the light incident surface by a predetermined distance, the through holes being arranged to form through-hole groups, each of which is adjacent each of the light sources, respectively,
   wherein centers of the through holes in each of the through-hole groups are arranged on a single straight line,
   wherein each of the through holes refracts the light beams incident into the light guide panel to be spread to various portions of the light guide panel as they pass through the through holes.

2. The light guide panel according to claim 1, wherein each of the through-hole groups including the through holes is lined in a length of 0.3 to 10.0 mm.

3. The light guide panel according to claim 1, wherein the through hole is formed apart from the light incident surface of the light guide panel in an interval of 0.1 to 3.0 mm.

4. The light guide panel of claim 1, where the single straight line is perpendicular to the path of the incident light beams.

* * * * *